No. 733,242. PATENTED JULY 7, 1903.
A. MAUSER.
PACKING BOTTLES, &c.
APPLICATION FILED NOV. 3, 1902.
NO MODEL. 5 SHEETS—SHEET 1.

Witnesses
Grace P. Brereton
Albert Popkins

Inventor
Alfons Mauser
By Sturtevant & Truly
Attys

No. 733,242. PATENTED JULY 7, 1903.
A. MAUSER.
PACKING BOTTLES, &c.
APPLICATION FILED NOV. 3, 1902.
NO MODEL. 5 SHEETS—SHEET 2.
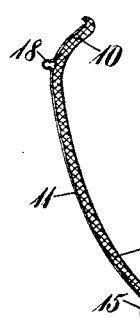
Fig. 5.
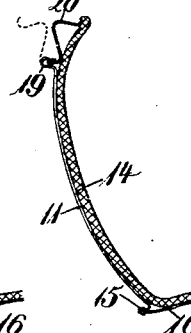
Fig. 6.
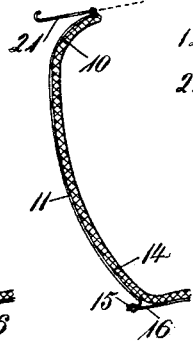
Fig. 7.
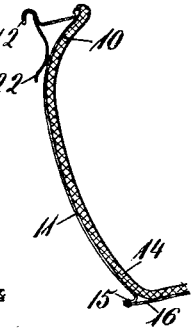
Fig. 8.
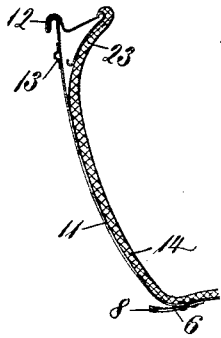
Fig. 9.
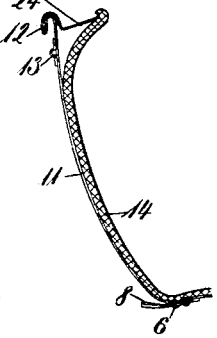
Fig. 10.
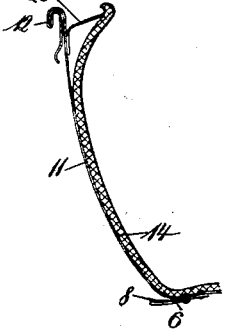
Fig. 11.
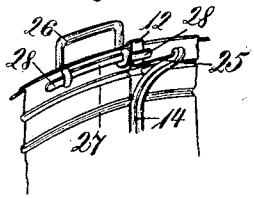
Fig. 12.
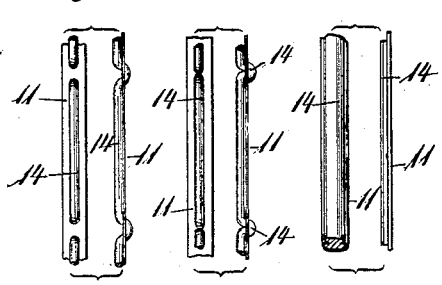
Fig. 12.ᵃ Fig. 12.ᵇ Fig. 12.ᶜ
Witnesses
Grace P. Brereton
Albert Hopkins
Inventor
Alfons Mauser
By Sturtevant & Greely
attys No. 733,242. PATENTED JULY 7, 1903.
A. MAUSER.
PACKING BOTTLES, &c.
APPLICATION FILED NOV. 3, 1902.
NO MODEL. 5 SHEETS—SHEET 3.
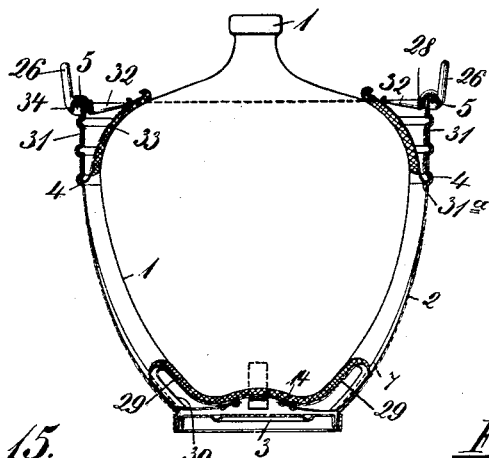
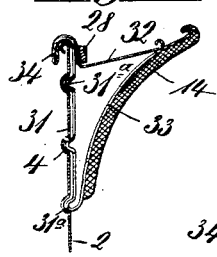
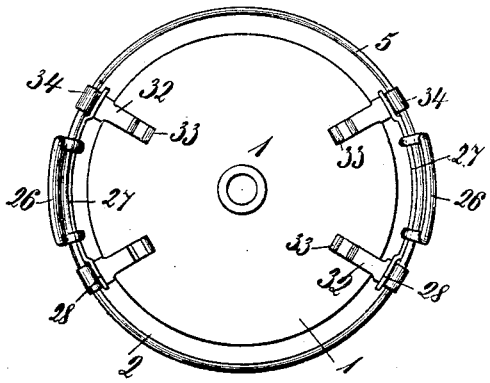

No. 733,242. PATENTED JULY 7, 1903.
A. MAUSER.
PACKING BOTTLES, &c.
APPLICATION FILED NOV. 3, 1902.
NO MODEL. 5 SHEETS—SHEET 4.
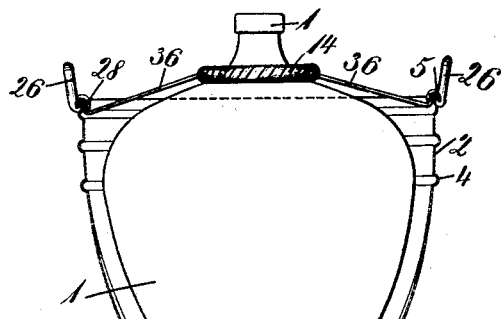
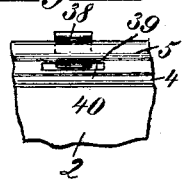
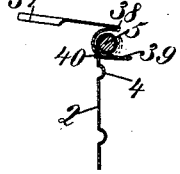
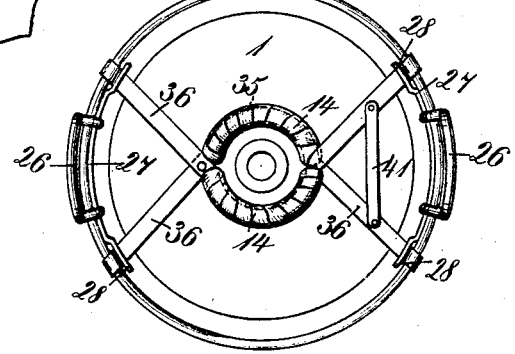
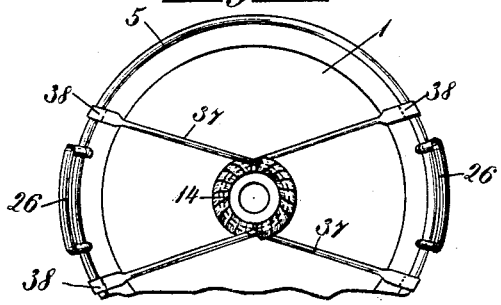

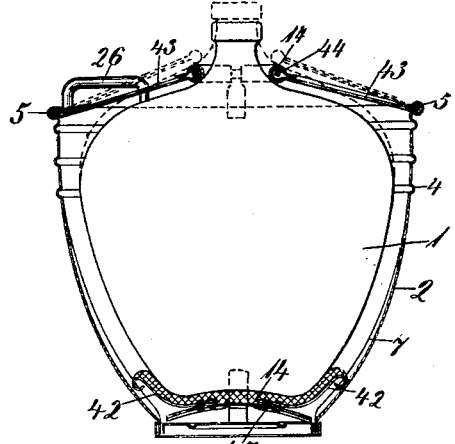
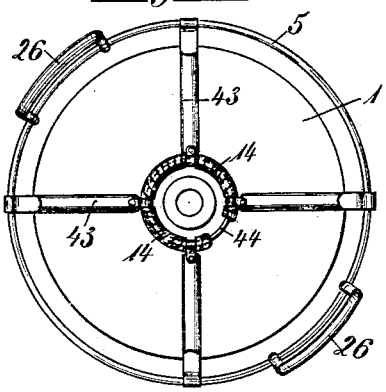
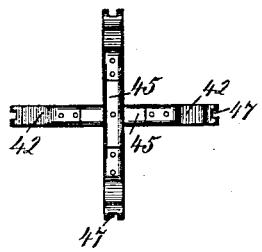

No. 733,242. Patented July 7, 1903.

UNITED STATES PATENT OFFICE.

ALFONS MAUSER, OF COLOGNE-EHRENFELD, GERMANY.

PACKING BOTTLES, &c.

SPECIFICATION forming part of Letters Patent No. 733,242, dated July 7, 1903.

Application filed November 3, 1902. Serial No. 129,987. (No model.)

*To all whom it may concern:*

Be it known that I, ALFONS MAUSER, a citizen of the German Empire, residing at Cologne-Ehrenfeld, in the Kingdom of Prussia, Germany, have invented certain new and useful Improvements in Packing Bottles, &c., of which the following is a description, reference being had to the accompanying drawings and to the figures of reference marked thereon.

In the United States patent application, Serial No. 111,198, of June 11, 1902, which relates to means for packing glass carboys, an arrangement is described in which the carboy is held down elastically at the top by means of a lid on the transport-case having springs or spring-tongues attached thereto which bear upon the carboy. For securing the carboy it is thus always necessary with this arrangement to provide a lid for the case, thus rendering the packing considerably more expensive.

Now this invention has for its object arrangements for retaining the carboy or the like while dispensing with the lid, by means of which arrangements the carboy is supported either hanging or standing in the transport-case and is held above by means of bent arms engaging with a spring action over the upper part of the bottle or carboy or by means of a separate ring laid over the bottle or carboy neck and connected with the edge of the case by means of arms or ties.

Figure 1:
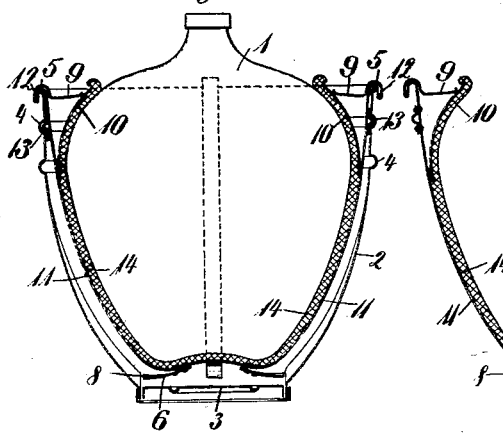
Figure 2:
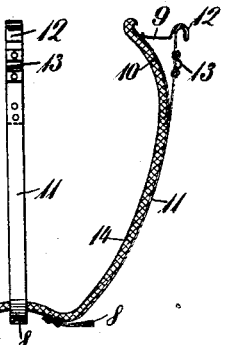
Figure 3:
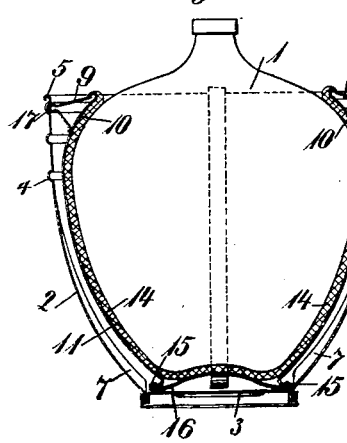
Figure 4:
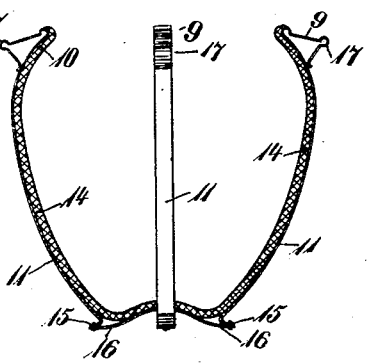

In the accompanying drawings, Figure 1 is a vertical sectional view showing an arrangement in which the carboy is located in a suspended insertion 11, which is hung by means of hooks 12 from the edge of the case 5 and engages over the top of the carboy by means of its upper spring-arms 10. Fig. 2 is a side elevation of the frame or insertion removed. Figs. 3 and 4 show two similar views of an insertion which stands in the packing-case and also has arms 10 engaging over the carboy. Figs. 5 to 11 show various forms of arms for both suspended and standing insertions. Fig. 12 shows an arrangement for fastening the insertion in the transport-case. Figs. 12ª, 12ᵇ, and 12ᶜ show carrying-bands with asbestos insertions, the asbestos in the form of a cord being shown held in various ways. In the arrangement shown in Fig. 13 in side view, in Fig. 14 in plan, Fig. 15 on an enlarged scale, and Fig. 16 as seen from the end a lower spring-bottom insertion is employed instead of an entirely suspended or standing one, on which bottom insertion the carboy is placed and is retained above by bent spring-arms having a wedging action. In Figs. 17 to 21, of which Fig. 17 is a sectional elevation, Fig. 18 a plan, Fig. 19 a plan view of a slightly-modified form, and Figs. 20 and 21 detail views of the band attachment, an arrangement is shown consisting of a lower spring-bottom insertion and at the top of the case bent arms or bands for engaging over the carboy-neck and retaining it, the ends of said bands being fixed to the edge of the case. Finally Fig. 22 is a sectional elevation, Fig. 23 a plan, and Fig. 24 a detail of a packing arrangement in which the carboy rests below on a spring-bottom insertion and is held above by means of a ring engaging over its neck, which ring is connected with the edge of the case by means of a number of arms hinged or pivoted on the ring.

All the parts of the insertions, bent arms, rings, and the like which come directly in contact with the carboy are incased or covered with a soft non-combustible acid-resisting covering of asbestos rope or the like, which may be fixed on the hoop, insertion, or the like in any suitable manner—for instance, as is indicated in Figs. 12ª, 12ᵇ, 12ᶜ.

The suspended insertion shown in Figs. 1 and 2 differs from that described in United States patent application Serial No. 111,198, of 1902, in that separate spring-arms 10, provided on their inner sides with a soft covering and engaging above over the glass carboy 1, are arranged on the support-arms 11. These arms 10 may be stiffened above by separate struts 9, forming one piece with the suspending-arm 11 or made separate and attached thereto. In order to prevent the suspended insertion from falling out of the transport-case 2, bent pieces 13 are riveted in such a position on the arms 11 of the insertion that their outwardly-projecting heads engage in one of the circular grooves 4 of the packing-case 2 or in some other suitable recesses provided in the case. Instead of a pin fixed on the insertion which engages on a bent piece fixed to the bottom, (as described in patent application Serial No. 111,198, of June 11, 1902,) arms 6 are riveted beneath on the arms of the insertion, the bent free ends 8 of said arms 6 being made to engage in and be guided by vertical grooves or flutings 7, formed in the walls of the case and curving inward toward the bottom, so that the insertion can be displaced vertically, but cannot move laterally in the case 2, or at any rate only to a very slight extent.

Figs. 3 and 4 show a standing insertion, in which the carrying-arms 11 are held beneath by means of outwardly-bent projections 15, engaging in the bottom of the carboy-case. These projections 15 are formed at the juncture of the horizontal bottom members 16 with the upwardly-extending members of the arms or bands 11. The elongated support-arms 10 engage in this case over the carboy and are bent almost horizontally, forming tongue-pieces 9, each of which engages, by means of a further bend 17, in one of the circular grooves 4 of the transport-case, while its oblique downwardly-directed end presses with a spring action on the outside of the support-arm 11. All parts of the insertion which come in contact with the glass carboy are again provided with a soft non-combustible acid-resisting coating 14, of asbestos cord or the like. The insertion is secured against lateral movements beneath by its bent projections 15 engaging in the vertical flutings or impressed grooves 7. These projections 15 are shown also in Figs. 5 to 18, to which reference should be made for the details of construction. The rounded ends 17 of the arms hold the insertion firmly in the packing-case 2, and as both the tongue-pieces and the arms 10, which engage over the carboy, have a spring action and the latter arms have also a lateral spring action the carboy is held on all sides elastically in the standing insertion—that is to say, in the packing-case 2. The carboy does not come in contact with any iron parts, as it rests only against the soft coverings 14. Similar devices are employed for standing insertions in Figs. 5 to 7, and these differ from those shown in Figs. 3 and 4 merely in the use of a different construction of the part of the insertion which engages over the carboy and in the top of the case. In Fig. 5 a bent part 18 for preventing the insertion from falling out is shown directly formed on the support-arms 11 and the part engaging over the carboy has no lateral stiffening or struts. In Figs. 6 and 7 stiffening-arms 20 and 21, adapted to be extended or moved laterally, as shown in dotted lines, are arranged at the upper end of the carrying-arms 11, and in the arrangement shown in Fig. 6 the insertion is held fast in practically the same manner as in the arrangement shown in Fig. 5 by a bent end or stud 19, which fits into a circular groove 4 or other suitable recess in the packing-case 2.

The arrangements of Figs. 8 to 11 are intended for suspended insertions, the upper ends of the suspending-arms in Fig. 8 being formed as laterally-springing arms 22, which press against the outside of the suspension-arms. In Fig. 9 the spring ends 23 act against the backs of the suspension-arms 11. In Fig. 10 the suspension-arm 11 has a part 24 bent out over the carboy from the hook 12. Finally, in Fig. 11 a separate arm 25 is shown engaging over the carboy and riveted to the suspension-arm 11.

All parts of the insertion which come directly in contact with the carboy are coated with asbestos cord or the like. The attachment of the asbestos cord 14 to the hoop-iron 11 may be effected by drawing it through holes formed in the hoop-irons 11, Fig. $12^a$, or by the cord being clamped in slots in the hoop-iron, Fig. $12^b$, and, if desired, fixed on the rear side by means of pins passed through the loop so formed or by the hoop-irons being flanged laterally over the asbestos cord, Fig. $12^c$.

Fig. 12 shows in perspective an arrangement for fastening a suspended or standing insertion in such a way as to make it easily removable, a bent piece 27 being held fast by the bent-over ends of the carrying-handle 26 and having both its ends 28 turned over and bent so as to project somewhat inwardly. The insertion 11 after having been inserted or suspended in the packing-case, as the case may be, is turned in such a way that two arms of the insertion which engage over the carboy lie directly under these catches 28, and thus the insertion is prevented from falling out. If the insertion be turned a little to one side, it can easily be lifted out again.

It is evident that the arms of the insertion which engage over the carboy may also be made in any other suitable form. The essential feature is regarded as the arrangement of spring-arms on the insertion engaging over the upper part of the carboy in a suitable manner and provided with a soft covering. These arms may also be provided with a device directly engaging in the grooves of the packing-case or in other suitable recesses in the same for preventing the insertions from falling out of the case.

In order to cheapen the packing and to avoid the pressure of the insertion upon the belly of a delicate carboy, packing arrangements (shown in Figs. 13 to 24) may also be employed. In these arrangements the carboy is seated beneath on a separate asbestos-coated lower insertion and protected above against lateral displacement and falling out of the packing-case by means of bent arms or bands having a wedge action and engaging over the sides and upper part of the carboy or by arms or rings engaging around the neck of the carboy and connected with the edge of the packing-case. By this means the carboy is only held fast by the packing at its strongest places—namely, at the bottom and the upper shoulder or the neck.

In the packing arrangement shown in Figs. 13 to 16 the insertion bottom consists of two spring-arms 29, lying crosswise one over the other, shaped to fit under the bottom of the carboy, and having a slight upward spring action. The side parts of the arms 29, the spring action of which is somewhat stronger, engage in grooves 7 in the packing-case 2. The arms 29 are lined internally with asbestos cord 14 or the like, held in their bent-over ends, which are provided beneath with guide-arms 30, which rest with their free ends on the under part of the packing-case 2 and prevent any lateral displacement of the insertion bottom piece in the manner already hereinbefore set forth. The carboy is held above by spring bent arms 31, which press laterally and elastically upon the upper part of the carboy with a wedge action by means of spring-arms 33, also internally coated with asbestos cord or the like. These arms 31 are suspended in the packing-case 2, or rather on its edge 5, by means of hooks 34 and press on the arms 33 by means of spring-tongues 32, which lie approximately horizontally and support the insertion from behind. The bent arms 31 are secured from falling out by their upper arms 32 being pushed under the bent parts 28 of the cross-piece 27 (see Fig. 12) or by their hook-shaped parts 34 being bent over the edge 5 of the packing-case or by means of lateral deflections 31$^a$, which engage in one or more circular grooves 4 in the packing-case 2, Figs. 13 to 16. The lower insertion holds the carboy only on its bottom and the adjacent part of its sides and the upper arms on its upper shoulder—that is to say, at the strongest parts of the carboy—thus practically removing the possibility of breakage of the bottle or carboy even in the case of very violent shocks. As there is a considerable saving in the expensive asbestos covering or the like in this improved arrangement of the insertion-piece in spite of the simultaneous reduction in danger of breakage of the carboy, it is considerably cheaper than the insertion connected in one piece. The bottom insertion 29 and also the bent arm 31 may of course be of any suitable form. Any suitable number of bent arms 31 may be employed, and, if necessary, they may be fixed on the vessel 2 by their hooks 34 being bent over the edge 5 of the said vessel in such a way that the bent pieces 27 may be dispensed with.

The packing shown in Figs. 17 to 21 consists of a low spring bottom insertion 29 of the kind shown in Figs. 1 to 4; but the carboy is held above by means of arms fixed on the edge 5 of the case and each engaging half of the carboy-neck 1 instead of the carboy being held by means of the bent arms 31.

In the arrangement shown in Figs. 17 and 18 the carboy-neck is held by means of arms 36, semicircularly bent in the middle 35 and pivotally attached to one another in the form of shears. They are provided at the points of contact with an asbestos covering 14. The ends of these arms engage hookwise over the edge 5 of the packing-case and are pushed under the hooks 28 of the bent arms 27, held on the case by means of the handles 26, and the arms 36 are connected with one another by means of a tie 41 in such a way that they can only escape from the hooks 28 after said tie is loosened, and they are thus held extremely firmly on the case.

In Figs. 19, 20, and 21 a packing is formed by means of two fork-shaped bent pieces 37 of suitable section lying one over the other and each engaging over half the carboy-neck by means of its bends, the parts pressing on the carboy being carefully covered with asbestos 14. Their flattened ends 38 are made to engage above and below edge 5 of the packing-case, and their under longer parts 39 are carried through slots 40 in the packing-case 2 and bent on the outside over the edge 5, whereby the carboy is securely and rigidly held above.

A similar packing to the two just described is shown in Figs. 22 to 24. The carboy is here held by means of a ring 44, provided with an asbestos coating 14, on which a number of hinged arms 43 are pivotally mounted, the ends of said arms being attached in any suitable manner to the edge 5 of the packing-case. This method of retaining the carboy by its neck has the advantage that it is capable of being used for carboys of unequal heights and varying shapes of neck, the arms only requiring then to be somewhat shortened or lengthened, respectively, and to be given a more or less inclined position. The bottom insertion in this case consists of a somewhat elastic cross-arm 45, on which short spring-arms 42 are fixed, each of which engages a groove or rib 7 in the case-wall by means of a slot 47, thereby providing a firm hold for the insertion in the packing-case. The arms of the cross 45 are bent upward in the center and domed in section in order to increase their strength without, however, too much affecting the spring action of the insertion.

It is evident that the bottom insertions 29 and 45, respectively, may be of any suitable form. The insertions may be elastically suspended in the carboy-case or arranged to stand elastically on the bottom of the same. They are always provided at the places where they touch the carboy with an asbestos coating. The device for retaining the carboy by its neck in the packing-case may also be of any suitable form.

Having now particularly described and ascertained the nature of my said invention and in what manner the same is to be performed, I declare that what I claim is—

1. The combination with the outer casing having a vertically-fluted lower portion, of crossed supporting or cushioning members in the bottom of the casing, and provided with projections or extensions fitting in said flutes.

2. The combination with the outer case and the vessel therein, of a cushioning mechanism between the vessel and casing-bottom, and also in the angle between the upper edge of the casing and the shoulder of the vessel, and extending over said shoulder, and interlocking members between the cushioning mechanism and the casing.

3. The combination with the case and the vessel therein, of a cushioning mechanism between the vessel and casing-bottom, and also in the angle between the upper edge of the casing and the shoulder of the vessel and extending over said shoulder, and interlocking devices connecting said casing and upper and lower portions of the cushioning mechanism.

4. The combination with the outer casing and cushioning mechanism for the upper and lower parts of the vessel, comprising crossed straps to inclose the vessel, inwardly-curved members at the upper ends of said straps to extend over the shoulders of the vessel, and means at the upper portion of said cushioning mechanism engaging the casing and holding the cushioning devices in place therein; substantially as described.

5. The combination with the casing having upper and lower grooves or corrugations, of a cushioning mechanism comprising crossed straps to inclose the vessel, projections at the upper and lower portions of the straps engaging the said grooves or corrugations, and holding the cushioning mechanism in place; substantially as described.

6. The combination with the casing of a cushioning mechanism, comprising the crossed straps provided at their upper portions with retaining means, engaging said casing and also provided with extensions projecting inwardly to engage the vessel's shoulders, and braces projecting inwardly over said shoulder-engaging extensions.

7. The combination with the casing of a cushioning mechanism, comprising crossed straps to inclose the vessel, said straps being provided at their upper ends with hooks to engage the upper edge of the casing, inwardly-curved arms extending from the straps over the vessel's shoulders and braces extending from the upper ends of the straps inwardly over said shoulder-engaging arms.

8. The combination with the casing of a cushioning mechanism, comprising crossed straps to inclose the vessel, and having their upper ends hooked to engage the upper edge of the casing, and provided with arms curved inwardly to engage the shouldered portion of a vessel, and angle-braces secured to said hooked ends, extending inwardly over said shoulder-engaging arms, and locking projections on the straps to enter recesses in the casing; substantially as described.

9. The combination with the casing having upper and lower grooves or corrugations, the crossed vessel-suspending straps having projections at their lower portions to engage the lower grooves and provided with hooks at their upper end to engage the upper edge of the vessel, and projections to engage the upper casing corrugations, and inwardly-extending arms to engage the vessel's shoulders.

10. The combination with the vessel-inclosing bands or straps, of non-corrosive strands extending along the inner faces of the bands or straps and interlocked therewith; substantially as described.

11. The combination with the vessel-inclosing bands or straps having apertures, of the non-corrosive strands extending along the inner faces of the straps and interlocked therewith through the said apertures; substantially as described.

In testimony whereof I affix my signature in presence of two witnesses.

ALFONS MAUSER.

Witnesses:
 CARL SCHMITT,
 JOH. SCHOLZ.